United States Patent
Wang

(10) Patent No.: US 11,225,180 B2
(45) Date of Patent: Jan. 18, 2022

(54) AUTOMOBILE HEADREST

(71) Applicant: Shenzhen Huimeng Business Information Technology Co., Ltd, Shenzhen (CN)

(72) Inventor: Yan li Wang, Huizhou (CN)

(73) Assignee: SHENZHEN HUIMENG BUSINESS INFORMATION TECHNOLOGY CO., LTD, Shenzhen (CN)

(*) Notice: Subject to any disclaimer, the term of this patent is extended or adjusted under 35 U.S.C. 154(b) by 165 days.

(21) Appl. No.: 16/845,892

(22) Filed: Apr. 10, 2020

(65) Prior Publication Data

US 2021/0268950 A1 Sep. 2, 2021

(30) Foreign Application Priority Data

Feb. 27, 2020 (CN) .......................... 202010124868.8

(51) Int. Cl.
| | |
|---|---|
| *A47C 1/08* | (2006.01) |
| *B60N 2/28* | (2006.01) |
| *B60N 2/26* | (2006.01) |
| *B60N 2/818* | (2018.01) |
| *B60N 2/885* | (2018.01) |
| *A47G 9/08* | (2006.01) |

(52) U.S. Cl.
CPC ............... *B60N 2/885* (2018.02); *A47G 9/08* (2013.01)

(58) Field of Classification Search
CPC ........ B60N 2/818; B60N 2/885; B60N 2/829; B60N 2/02; B64D 11/0642; B64D 11/0646; A47G 9/1081
See application file for complete search history.

(56) References Cited

U.S. PATENT DOCUMENTS

| | | | | |
|---|---|---|---|---|
| 11,124,099 | B2* | 9/2021 | Mo .......................... | A47C 7/38 |
| 2006/0001300 | A1* | 1/2006 | Harcourt ................ | B60N 2/286 |
| | | | | 297/250.1 |
| 2006/0033374 | A1* | 2/2006 | Pos ...................... | B60N 2/2872 |
| | | | | 297/397 |
| 2012/0080925 | A1* | 4/2012 | Steinmetz .............. | B60N 2/818 |
| | | | | 297/391 |

(Continued)

FOREIGN PATENT DOCUMENTS

CN          202429093 U     9/2012

*Primary Examiner* — Shin H Kim
(74) *Attorney, Agent, or Firm* — WPAT, PC

(57) ABSTRACT

An automobile headrest includes a mounting component, a pillow portion detachably connected with the mounting component, a movable block provided with engaging protrusions arranged vertically, a side of the pillow portion adjacent to the mounting component is provided with a groove, at least part of the movable block is movably arranged in the groove, an end of the movable block disposed with the engaging protrusions is exposed from a groove opening of the groove, the pillow portion is provided with a vertically oriented slideway adjacent to the groove opening, the mounting component is provided with a sliding block matched with the slideway, the sliding block is provided with an engagement portion matched with the engaging protrusions, the sliding block is arranged in the slideway, the engaging protrusions are protruded from the groove opening and partially arranged in the engagement portion, when the pillow portion is connected with the mounting component.

20 Claims, 13 Drawing Sheets

(56) References Cited

U.S. PATENT DOCUMENTS

| | | | | |
|---|---|---|---|---|
| 2019/0359105 A1* | 11/2019 | Kondo | ................... | B60N 2/865 |
| 2021/0061150 A1* | 3/2021 | Mo | .......................... | A47C 7/38 |
| 2021/0178947 A1* | 6/2021 | Clough | ................. | B60N 2/818 |
| 2021/0268950 A1* | 9/2021 | Wang | ..................... | B60N 2/882 |
| 2021/0269162 A1* | 9/2021 | Hoover | ............. | B64D 11/0646 |

* cited by examiner

AUTOMOBILE HEADREST

FIELD OF THE DISCLOSURE

The disclosure relates to the technical field of automobile accessories, and in particular to an automobile headrest.

BACKGROUND OF THE DISCLOSURE

At present, there is an automobile headrest, which is directly tied to a head portion of an automobile seat. A position of the automobile headrest with respect to the head portion is unable to be adjusted, and thus it is inconvenient for a user to use the automobile headrest. There is also a push-pull automobile neck pillow (referring to a document of Chinese Utility Patent No. CN202429093), although a position of the automobile neck pillow with respect to a body of an automobile seat is able to be adjusted, it has a complicated structure and still is inconvenient for the user to adjust.

SUMMARY OF THE DISCLOSURE

The disclosure provides an automobile headrest, which is convenient to adjust vertically, simple in structure and more convenient to use.

In order to achieve the above object, the application provides an automobile headrest. The automobile headrest comprises a mounting component and a pillow portion detachably connected with the mounting component, wherein the automobile headrest further comprises a movable block, the movable block is provided with a plurality of engaging protrusions arranged vertically, and a side of the pillow portion adjacent to the mounting component is provided with a groove, at least part of the movable block is movably arranged in the groove, an end of the movable block disposed with the engaging protrusions is exposed from a groove opening of the groove, and the engaging protrusions are capable of being selectively received in the groove or protruded from the groove opening of the groove, the pillow portion is provided with a vertically oriented slideway adjacent to the groove opening of the groove, the mounting component is provided with a sliding block matched with the slideway, and the sliding block is provided with at least one engagement portion matched with the engaging protrusions, the sliding block is arranged in the slideway and the engaging protrusions are protruded from the groove opening of the groove and partially arranged in the engagement portion, in a situation of the pillow portion being connected with the mounting component.

In the technical solutions of the application, since the movable block is provided with a plurality of engaging protrusions arranged vertically, and a side of the pillow portion adjacent to the mounting component is provided with a groove, at least part of the movable block is movably arranged in the groove, an end of the movable block disposed with the engaging protrusions is exposed from a groove opening of the groove, and the engaging protrusions are capable of being selectively received in the groove or protruded from the groove opening of the groove, the pillow portion is provided with a vertically oriented slideway adjacent to the groove opening of the groove, the mounting component is provided with a sliding block matched with the slideway, and the sliding block is provided with at least one engagement portion matched with the engaging protrusions, the sliding block is arranged in the slideway and the engaging protrusions are protruded from the groove opening of the groove and partially arranged in the engagement portion, in a situation of the pillow portion being connected with the mounting component. Based on the above, the automobile headrest is capable of being adjusted vertically, and the engaging protrusions can be protruded from the groove or accommodated in the groove in a case that the movable block is pressed, so that the engaging protrusions can be selectively connected with or separated from the engagement portion at a corresponding position. The structure of the automobile headrest is simple and compact and can be adjusted more convenient and quickly.

BRIEF DESCRIPTION OF THE DRAWINGS

In order to explain technical solutions of the disclosure more clearly, drawings needed to be used in the description of embodiments will be briefly introduced hereinafter. It is clear that the drawings in the following description are just some embodiments of the disclosure, and other drawings can be obtained by a person of ordinary skill in the art according to the drawings, without creative labor.

DESCRIPTION OF REFERENCE NUMBERS

| No. | Description | No. | Description |
| --- | --- | --- | --- |
| 10 | mounting component | 15 | elastic button |
| 11 | sliding block | 16 | hook |
| 111 | engagement portion | 17 | gear wheel |

-continued

| No. | Description | No. | Description |
|-----|-------------|-----|-------------|
| 112 | connecting portion | 171 | convex portion |
| 113 | sliding portion | 18 | rotation adjusting component |
| 114 | accommodating area | 181 | movable knob |
| 12 | mounting base | 182 | fixed block |
| 121 | accommodating slot | 1821 | connecting hole |
| 122 | through-hole | 183 | connector |
| 13 | transversely movable component | 184 | elastic component |
| 131 | engagement slot | 20 | pillow portion |
| 132 | sliding slot | 21 | groove |
| 1321 | installation hole | 211 | breach |
| 133 | accommodating cavity | 22 | slideway |
| 14 | clamping component | 23 | supporting block |
| 141 | mounting plate | 24 | clamping block |
| 142 | supporting portion | 25 | connecting block |
| 143 | separating bush | 26 | spring |
| 144 | gear rack | 30 | movable block |
| 145 | sliding component | 31 | engaging protrusion |
| 146 | hook portion | 32 | pressing portion |
| 147 | elastic connector | 33 | limiting block |

Implementations, functional characteristics and advantages of the disclosure will be further explained in combination with embodiments with reference to the drawings.

DETAILED DESCRIPTION OF EMBODIMENTS

The technical solutions in the embodiments of the disclosure will be described clearly and completely hereinafter with reference to the drawings in the embodiments of the disclosure. It is clear that the described embodiments are only a part of embodiments of the disclosure, not all of the embodiments of the present disclosure. Based on the embodiments of the disclosure, other embodiments obtained by the person of ordinary skill in the art without creative labor all fall within the scope of the disclosure.

The disclosure provides an automobile headrest.

Figure 1:
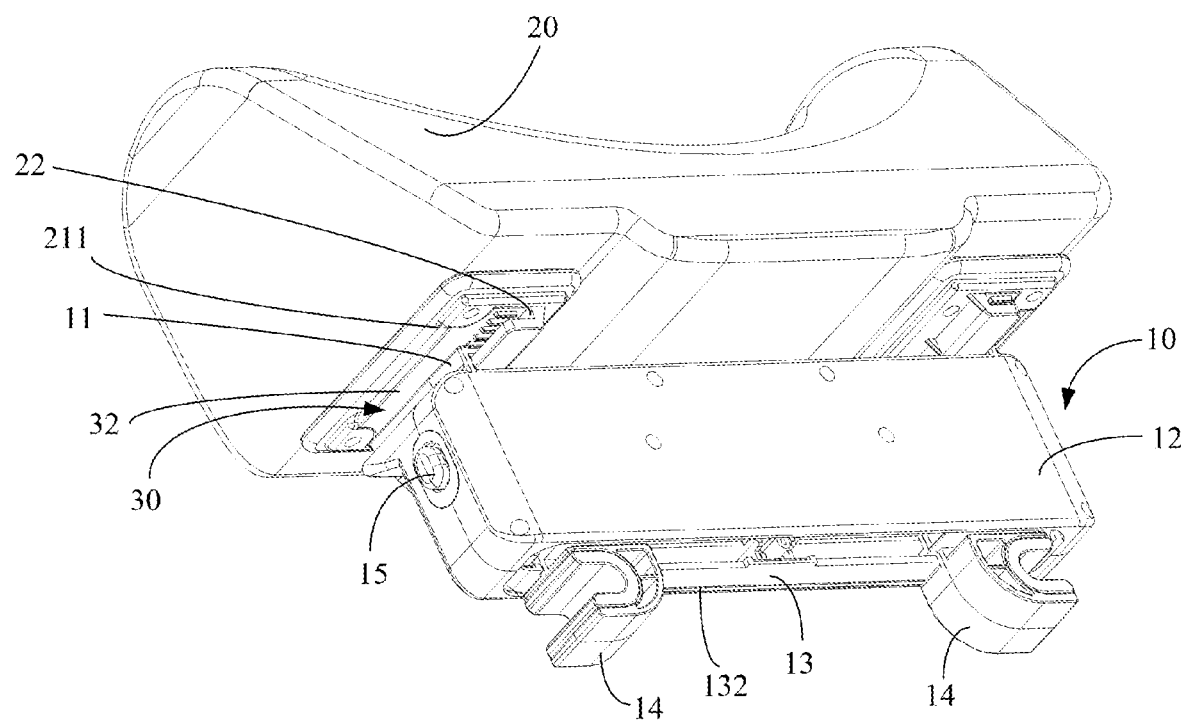
FIG. 1 is a three-dimensional schematic structural diagram of an automobile headrest according to a first embodiment of the disclosure.
Figure 2:
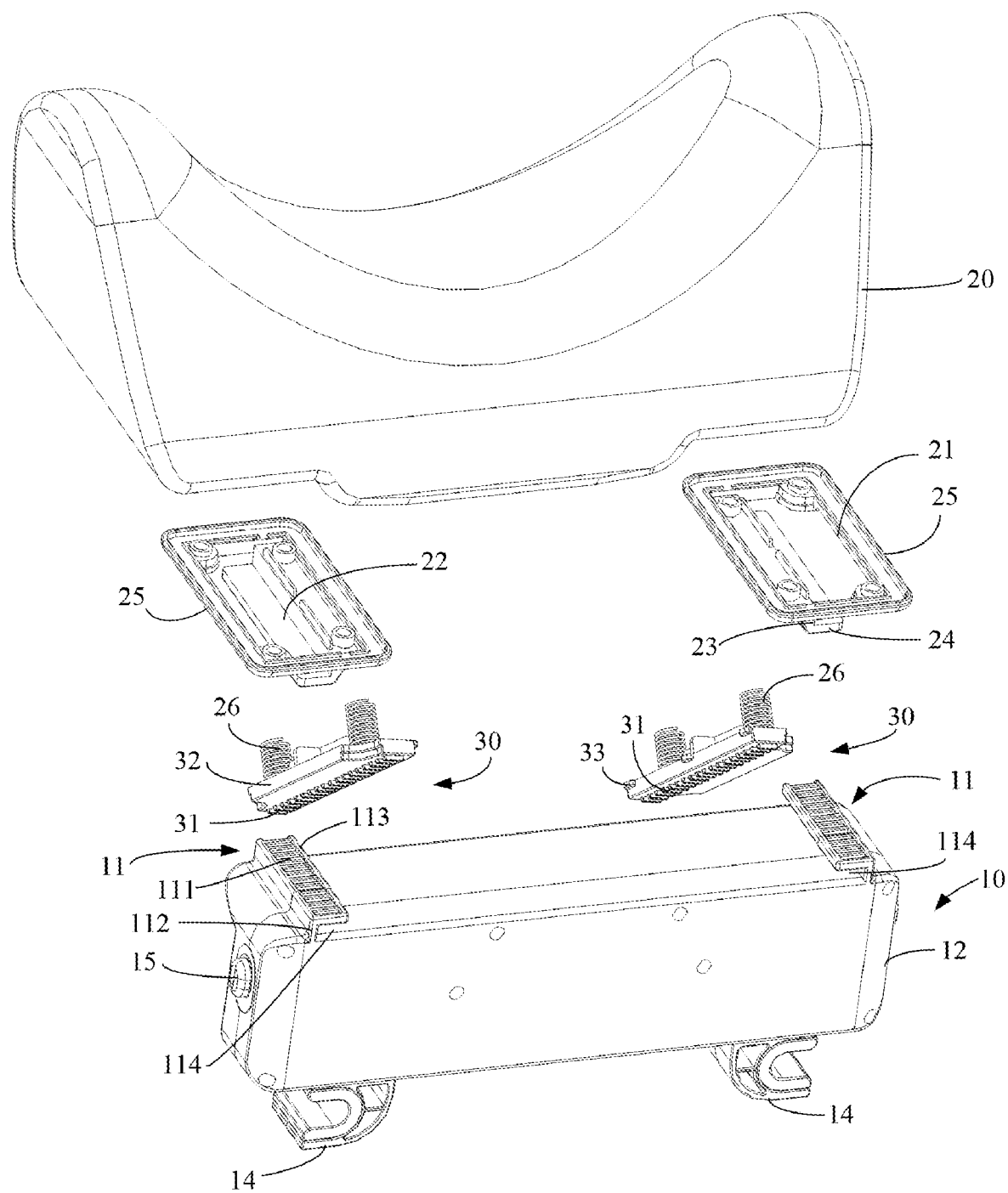
FIG. 2 is a partially exploded schematic structural diagram of the automobile headrest of FIG. 1.
Figure 13:
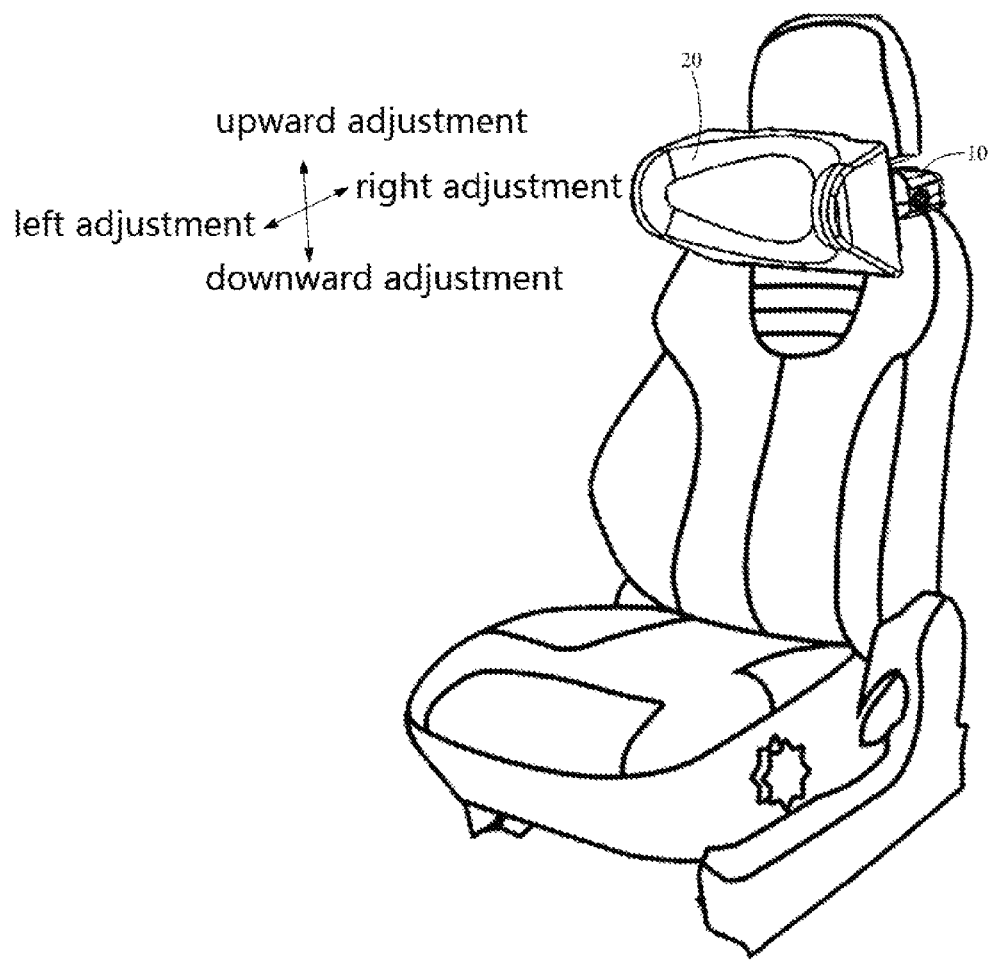
FIG. 13 is a three-dimensional structural schematic diagram of an automobile seat on which an automobile headrest is fixed on a head thereof.

As shown in FIGS. 1, 2, and 13, in a first embodiment of the disclosure, the automobile headrest includes a mounting component 10 and a pillow portion 20 detachably connected with the mounting component 10. The automobile headrest further includes movable blocks 30, and the movable block 30 is provided with a plurality of engaging protrusions 31 arranged vertically. A side of the pillow portion 20 adjacent to the mounting component 10 is provided with a groove 21.

At least part of the movable blocks 30 is movably arranged in the grooves 21. An end of the movable blocks 30 disposed with the engaging protrusions 31 is exposed from a groove opening of the groove 21. The engaging protrusions 31 are capable of being selectively received in the groove 21 or protruded from the groove opening of the groove 21.

The pillow portion 20 is provided with a vertically oriented slideway 22 adjacent to the groove opening of the groove 21.

The mounting component 10 is provided with a sliding block 11 matched with the slideway 22, and the sliding block 11 is provided with at least one engagement portion 111 matched with the engaging protrusions 31.

The sliding block 11 is arranged in the slideway 22, and the engaging protrusions 31 are protruded from the groove opening of the groove 21 and partially arranged in the engagement portion 111, in a situation of the pillow portion 20 being connected with the mounting component 10.

Wherein the engaging protrusions 31 are arranged at uniform intervals. The number of the engagement portion 111 can be at least two and the at least two engagement portions are arranged at uniform intervals. Each of the engaging protrusions 31 may be a convex block, and the engagement portion 111 is a slot matched with the convex block. A position of the pillow portion 20 along the length direction of the movable blocks 30 can be adjusted by placing the engaging protrusions 31 in the engagement portion 111 at different positions or connecting the engagement portion 111 with the engaging protrusions 31 at different positions. The engaging protrusions 31 is fixedly arranged on the movable block 30, when the corresponding movable block 30 is moved, the engaging protrusions 31 can be moved and accommodated in a corresponding groove 21 or to protruded from the groove opening of the groove 21. Since the sliding blocks 11 and the slideways 22 are matched one bye one, the pillow portion 20 will be vertically adjusted more stably. Further, since the engagement portion 111 is arranged on the sliding block 11, the movable block 30 is arranged on the groove 21, and the engaging protrusions 31 are arranged on the movable block 30, a structure of the automobile headrest is more compact. Moreover, only when the movable block 30 is pressed, the engaging protrusions 31 thereof are able to be protruded from the groove 21 or received in the groove 21, and thus the engaging protrusions 31 can be selectively connected with or separated from the engagement portions 111 at a corresponding position. The structure of the pillow portion 20 is simple and compact, and cab be adjusted more conveniently and quickly.

Based on the embodiment above, the pillow portion 20 is provided with a vertically extended supporting block 23 adjacent to the groove opening of the groove 21, an end of the supporting block 23 away from the pillow portion 20 is bent towards a direction approaching the groove 21 to form a clamping block 24; the supporting block 23, the clamping block 24 and a corresponding part of the movable block 30 together form the slideway 22, and the engaging protrusions 31 are positioned in the slideway 22. Wherein the supporting block 23, the clamping block 24 and the pillow portion 20 may be formed integrally. Since the supporting block 23, the clamping block 24 and the corresponding part of the movable block 30 form the slideway 22, the structure of the pillow portion 20 is simple and compact, and can be adjusted more conveniently and quickly.

Based on the embodiment above, the sliding block 11 includes a connecting portion 112 arranged on the mounting component 10, and a sliding portion 113 arranged at an end of the connecting portion 112 away from the mounting component 10 and bent relative to the connecting portion 112; the connecting portion 112, the sliding portion 113 and a corresponding part of the mounting component 10 together form an accommodating area 114; the engagement portion 111 is arranged on a wall of the sliding portion 113 away from the mounting component 10. The sliding portion 113 is be arranged in the slideway 22, the clamping block 24 is arranged in the accommodating area 114, and the engaging protrusions 31 are protruded from the groove opening of the groove 21 and partially arranged in the engagement portion 111, in the situation of the pillow portion 20 being connected with the mounting component 10. In this way, the sliding block 11, the supporting block 23 and the clamping block 24 corresponding to the slideway 22 form a mutual clamping structure, such that the mounting component 10 and the pillow portion 20 is connected more tighter and more stable. The pillow portion 20 is more stable and more convenient to be used as being adjusted and moved.

Based on the embodiment above, the movable block 30 is provided with a pressing portion 32, a spring 26 is arranged in the groove of the pillow portion 20, the pressing portion 32 is exposed from the groove 21 and positioned outside the slideway 22, an end of the spring 26 is abutted against an inner wall of the groove 21, and the other end of the spring 26 is abutted against the movable block 30. By means of the pressing portion 32, the movable block 30 can be moved into the groove 21, the engaging protrusions 31 of the movable block 30 can be also moved and thus separated from the corresponding engagement portion 111, such that the pillow portion 20 can be adjusted. Since the spring 26 is abutted against the movable block 30, after the position of the pillow portion 20 is adjusted and when the pressing portion 32 is released, the movable block 30 can be automatically reset under an action of a restoring force of the spring 26, and the clamping protrusion 31 is clamped with the corresponding engagement portion 111, so that the movable block 30 is more convenient to use.

Based on the embodiment above, a breach 211 is provided at an edge of the groove 21 away from the supporting block 23, and the pressing portion 32 is exposed from the breach 211. By setting the breach 211, it is more convenient to press the pressing portion 32 by manual or other tools.

Based on the embodiment above, a limiting block 33 is arranged on a side surface of an end of the movable block 30 away from the engaging protrusions 31, and the limiting block 33 is arranged inside the groove 21. The limiting block 33 is capable of preventing the movable block 30 departing from the groove 21, so that the movable block 30 can be moved more stably. The movable block 30, pressing portion 32, the engaging protrusions 31 and the limiting block 33 can be an integrated structure, so it is more convenient to be manufactured and installed.

For the other embodiment of the disclosure, the automobile headrest includes a connecting block 25 arranged on the pillow portion 20, an end of the connecting block 25 is connected with the pillow portion 20, and the other end of the connecting block 25 is provided with the groove 21. The connecting blocks 25 can be connected or adhered to a back surface of the pillow portion 20 by screws, it is not required to arrange a groove on the back surface of the pillow portion 20, it is facilitated to adjust a position of the groove 21 by the connecting block 25, such that it is more convenient to manufacture and assemble the connecting block 25, and enhancing an interchangeability and adjustability thereof.

Based on the embodiment above, the movable blocks 30 is two in quantity and the grooves 21 is two in quantity, the two grooves 21 are respectively located at two opposite ends of a side of the pillow portion 20 adjacent to the mounting component 10 and each of the two movable blocks 30 is at least partially located in a corresponding one of the two grooves 21. Therefore, the pillow portion 20 can be adjusted more stably and is convenient for use.

Figure 3:
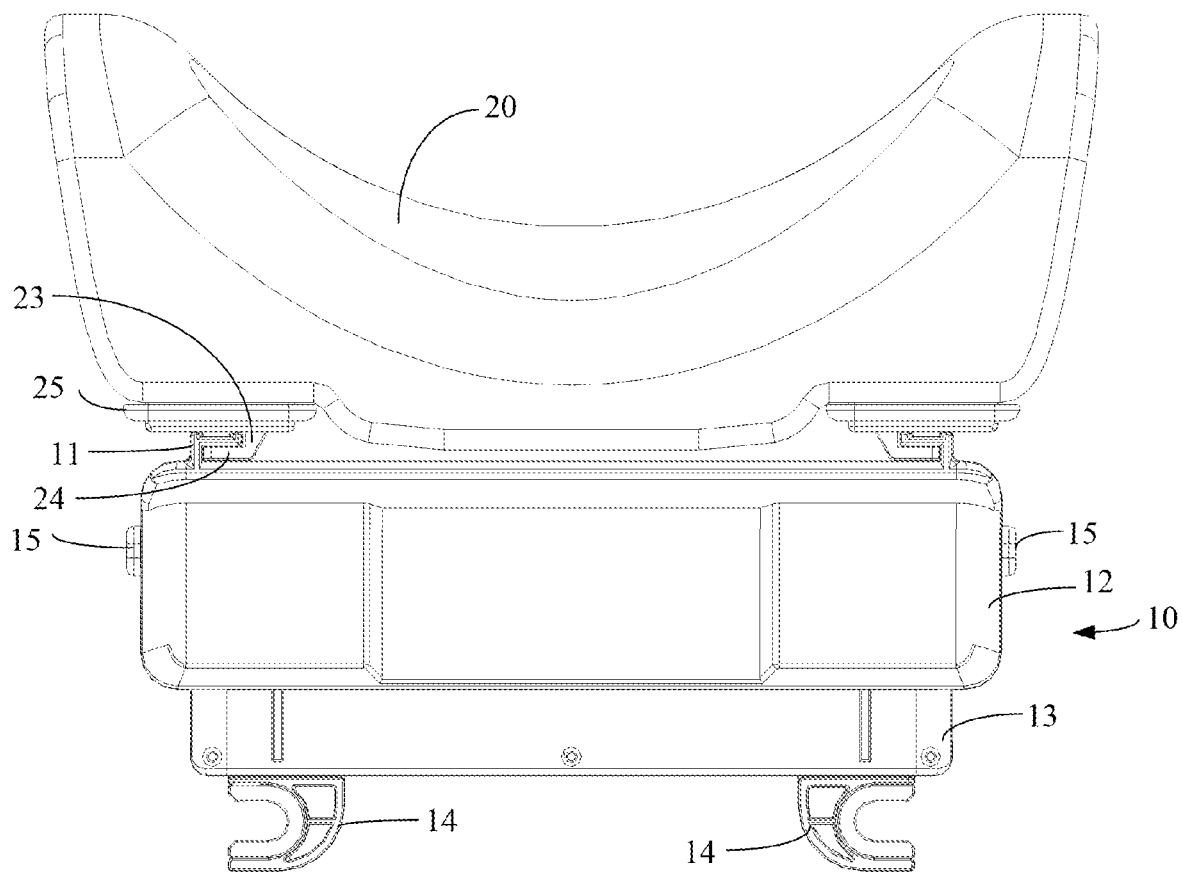
FIG. 3 is a schematic structural diagram of a transversely movable component of the automobile headrest of FIG. 1 in a opening state.
Figure 4:
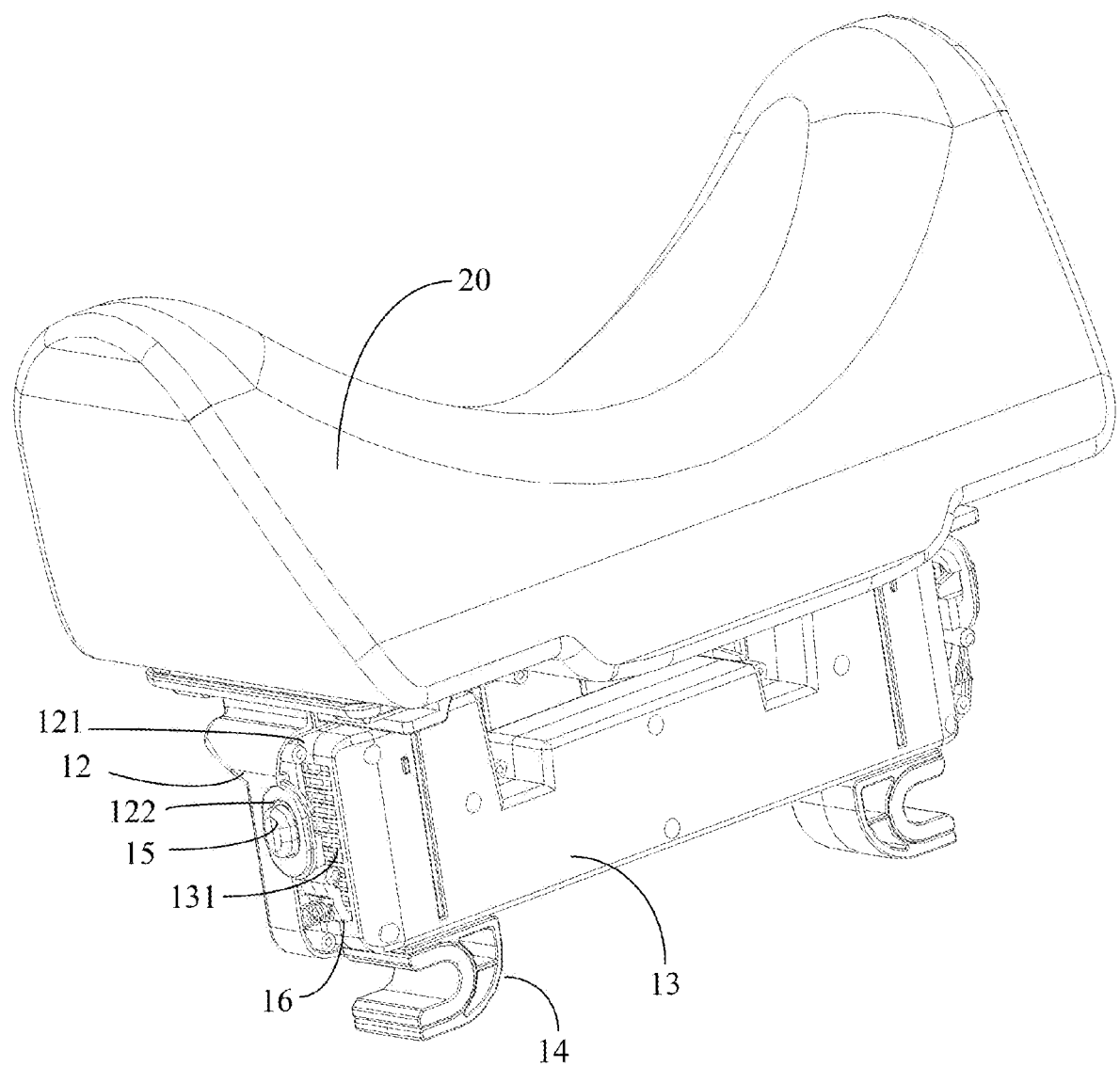
FIG. 4 is a schematic diagram of an internal structure of a mounting base of the automobile headrest of FIG. 1.
Figure 5:
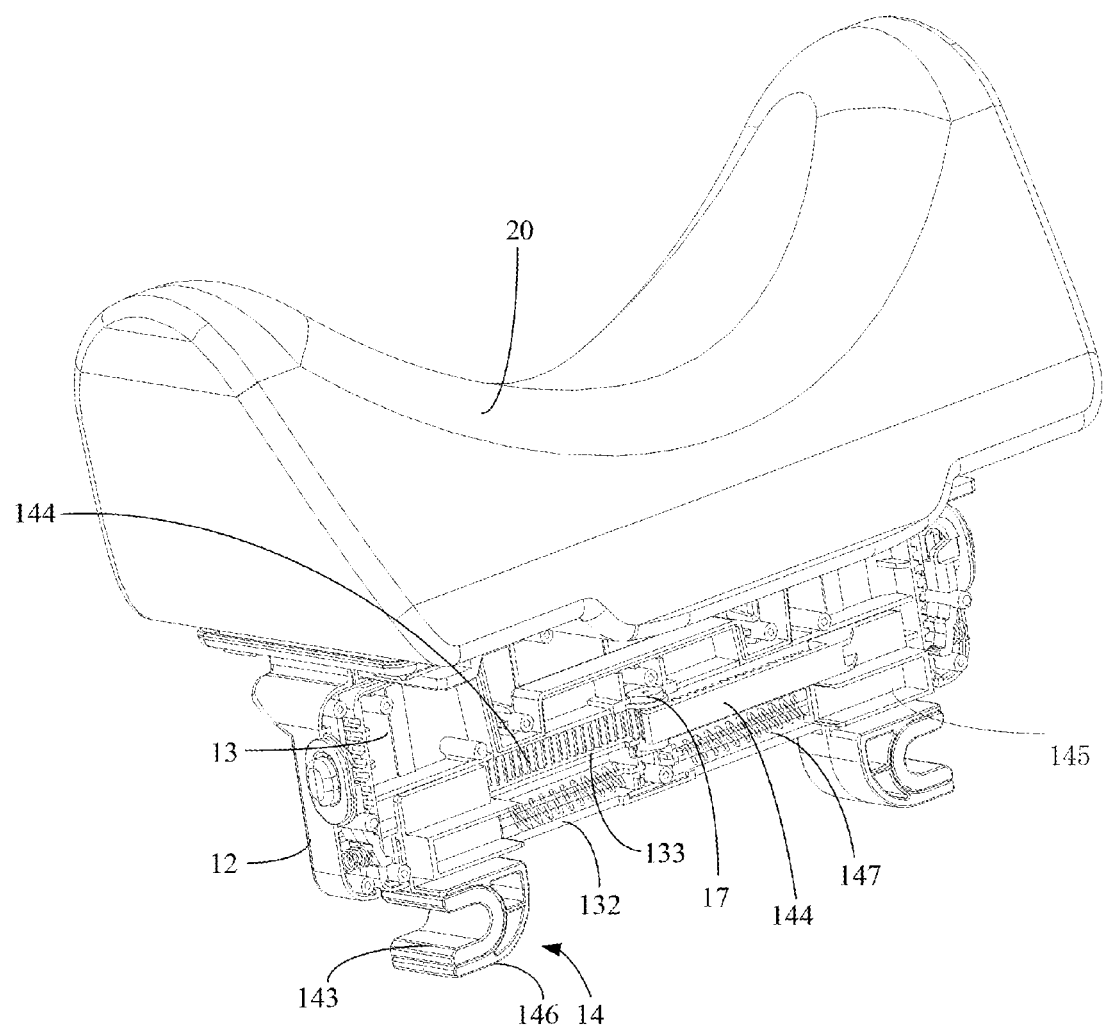
FIG. 5 is a schematic diagram of an internal structure of a transversely movable component of the automobile headrest of FIG. 4.

As shown in FIGS. 3 to 5, based on the embodiment above, the mounting component 10 includes a mounting base 12, a transversely movable component 13 and a clamping component 14, the sliding block 11 is arranged on an end of the mounting base 12, the transversely movable component 13 is movably arranged on the other end of the mounting base 12 away from the sliding block 11, the clamping component 14 is arranged on the transversely movable component 13 and is capable of being selectively close to the sliding block 11 or away from the sliding block 11. Wherein the clamping component 14 can be clamped with a connecting rod of a head of an automobile seat. The transversely movable component 13 can be transversely stretched or contracted. The clamping component 14 are arranged on the transversely movable component 13, the sliding block 11 is arranged at an end of the mounting base 12 away from the clamping component 14. The pillow portion 20 can be relatively vertically adjusted with respect to the mounting base 12. The pillow portion 20 and the clamping component 14 can be adjusted relatively close or away from each other through the transversely movable component 13, such that the pillow portion 20 can be adjusted vertically and transversely and thus it is more convenient to be used.

Based on the embodiment above, an accommodating slot 121 is provided on an end of the mounting base 12 away from the sliding block 11, the transversely movable component 13 is at least partially arranged in the accommodating slot 121, and the clamping component 14 is provided at an end of the transversely movable component 13 exposed from an opening of the accommodating slot 121. In this way, the transversely movable component 13 and the mounting base 12 are connected stably, the transversely movable component 13 can be moved more stably, and the pillow portion 20 can be adjusted transversely more stable. As the transversely movable component 13 is accommodated in the accommodating slot 121, the structure of the automobile headrest can be more compact.

Based on the embodiment above, wherein the mounting component 10 further includes an elastic button 15 and a hook 16 arranged on the elastic button 15, the transversely movable component 13 is provided with engagement slots 131 arranged transversely and a through-hole 122 communicated with the accommodating slot 131 is provided at a position of the mounting base 12 corresponding to the engagement slots 131, an end of the elastic button 15 provided with the hook 16 is movably arranged in the accommodating slot 121, the hook 16 is capable of being selectively arranged in one of the engagement slots 131, and an end of the elastic button 15 away from the hook 16 is exposed from the through-hole 122. The elastic button 15 may be a button which can be automatically reset through a spring structure. Specifically, the elastic button may be a connecting rod, a structure of middle portion of the connecting rod is a hinged structure, an end of which is provided with a button and a spring, and the other end is provided with a hook 16. When the button is in an initial position, the hook 16 is arranged in the engagement slots 131. When the button is pressed down, the hook 16 will be separated from the engagement slots 131, when the button is released, the button is automatically reset under an action of a restoring force of the spring structure. Since the hook 16 can be selectively placed in one engagement slot 131, thus a position of the transverse stretching of the pillow portion 20 can be adjusted, a lateral stretching position of the pillow portion 20 is adjusted correspondingly, such that it is more convenient and fast to perform a transverse adjustment on the pillow portion 20, and the structure thereof is more compact.

Based on the embodiment above, the transversely movable component 13 is provided with two groups of engagement slots 131 arranged transversely; the two groups of engagement slots 131 are respectively arranged in two opposite side walls of the transversely movable component 13 or the two groups of engagement slots 131 are arranged on an upper surface of the transversely movable component 13 at intervals or the two groups of engagement slots 131 are arranged on a lower surface of the transversely movable component 13 at intervals. The elastic button 15 is correspondingly arranged to meet different requirements, and the transversely movable component 13 can be moved more stably with the connection of the two groups of engagement slot 131, and the pillow portion 20 can be transversely adjusted more convenient.

Based on the embodiment above, the clamping components 14 is two in quantity, and each of the two clamping components 14 includes a sliding component 145, a hook portion 146 and an elastic connector 147, two sliding slots 132 are provided at an end of the transversely movable component 13 exposed from the opening of an accommodating slot 121 the two sliding slots 132 are transversely arranged at intervals, the elastic connector 147 is arranged in the sliding slot 132, the hook portion 146 is arranged outside the sliding slot 132, an end of the sliding component 145 is arranged in the sliding slot 132 and connected with an end of the elastic connector 147, the other end of the elastic connector 147 is connected with the hook portion 146, and the two hook portions 146 of the two clamping components 14 are capable of being selectively close to or away from each other. The elastic connector 147 may be a spring, and the two hook portions 146 can be selectively close to or away from each other, so as to adjust a position of the hook portion 145 to correspond to a position of the connecting rod of the head portion of an external automobile seat for clamping the hook portion 145 and the connecting rod. The hook portions 146 can be moved more stably after being clamped with the connecting rod of the head portion of the external automobile seat through the elastic connector 147, so as to prevent the hook portions 146 from detaching the head portion of the external automobile seat, and it is convenient to be used.

Figure 10:
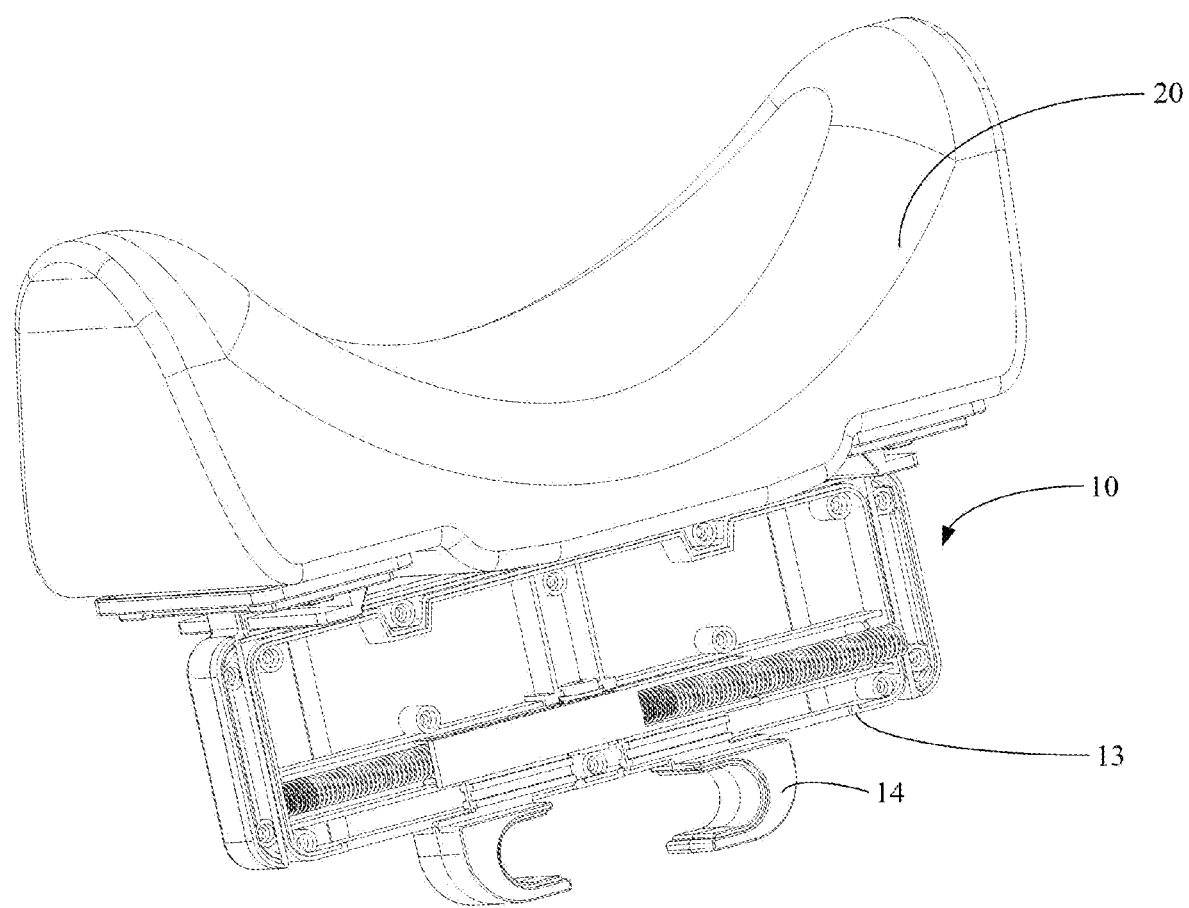
FIG. 10 is a schematic structural diagram of an internal structure of the automobile headrest of FIG. 9.

Based on the embodiment above, as shown in FIGS. 1 and 10, the hook portion 146 may be a blocky structure which is bent and has an arc-shaped groove, an end of each of the two hook portions 146 is connected with the corresponding sliding component 145, and groove openings of the arc-shaped grooves of the two hook portions 146 are arranged facing toward or facing away from each other. Based on this, the connecting rod of a head portion of different external automobile seats can be clamped, and the hook portion is easier to be used.

Figure 11:
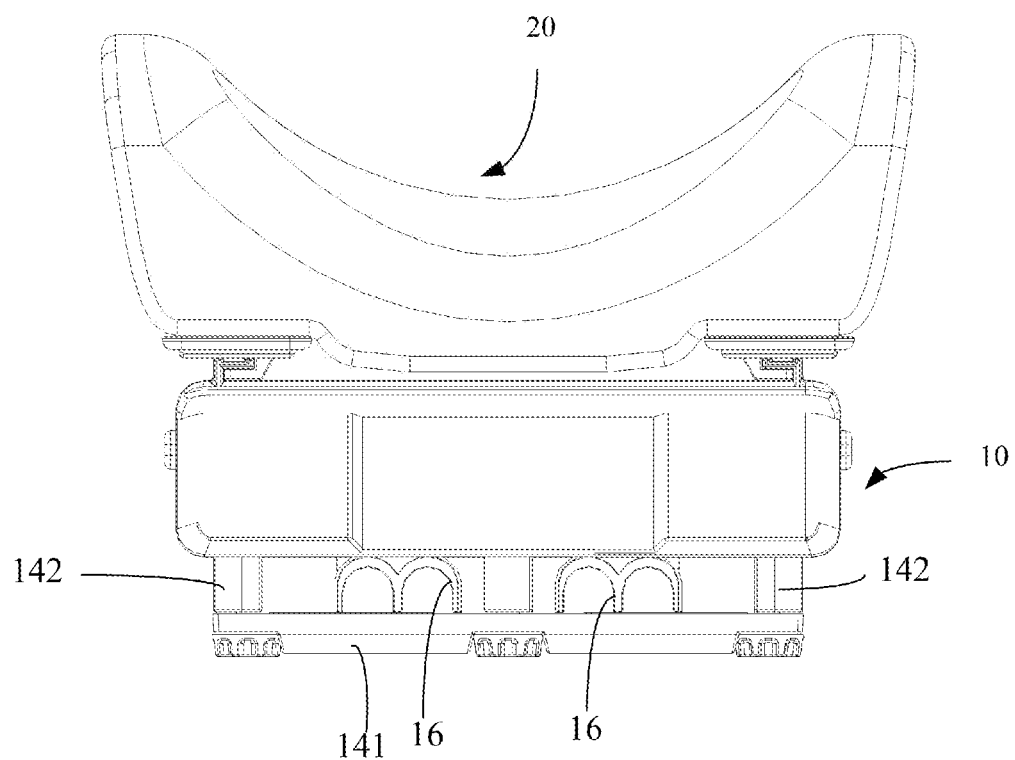
FIG. 11 is a schematic structural diagram of an automobile headrest according to a fourth embodiment of the disclosure.
Figure 12:
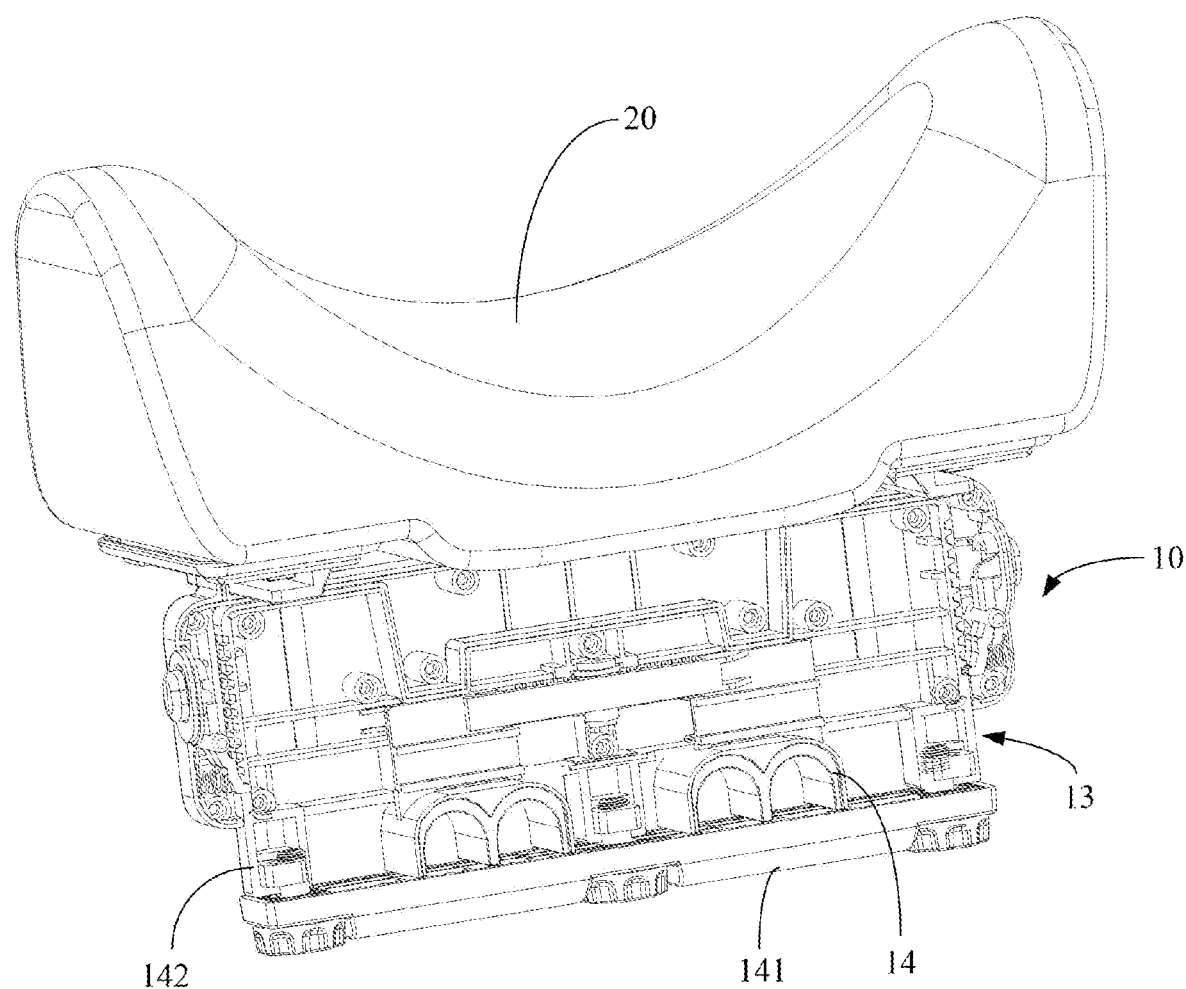
FIG. 12 is a schematic structural diagram of an internal structure of the automobile headrest of FIG. 11.

Based on the embodiment above, as shown in FIGS. 11 and 12, the hook portion 146 is a blocky structure which is bent and has an arc-shaped groove, middle portions of outer walls of the arc-shaped grooves of the two hook portions 146 are connected with the sliding components 145 respectively, and the openings of the arc-shaped grooves are facing away from the sliding block 11. Based on this, the connecting rod of a head portion of different external automobile seats can be clamped, and the hook portion is easier to be used.

Based on the embodiment above, the clamping component 14 further includes a mounting plate 141 and at least one supporting portion 142, the mounting plate 141 and the transversely movable component 13 are arranged opposite to and spaced from each other, an end of each of the at least one supporting portion 142 is connected with the transversely movable component 13, and the other end of the each of the at least one supporting portion 142 is detachably connected with the mounting plate 141, the hook portion 146 is positioned between the transversely movable component 13 and the mounting plate 141. Wherein the mounting plate 141 can be connected with the supporting portion 142 through a bonding manner or a screw, the supporting portion 142 can be connected with an end of the transverse stretching member 13 with the hook portion 146 through the bonding manner or the screw, the hook portion 146 is positioned between the supporting portion 142 and the transverse stretching member 13. The connecting rod of the head portion of the external automobile seat can be clamped firmly through the supporting portion 142 and the hook portion 146, and the connection between the automobile headrest and the connecting rod of head portion of the external automobile seat is more stable.

Based on the embodiment above, the hook portion 146 is a blocky structure which is bent and has two arc-shaped grooves, the two arc-shaped grooves are transversely arranged side by side, and an opening of each of the two arc-shaped grooves is facing towards the mounting plate 141. Through the arrangement of the support portion 142 and the hook portion 146, the connecting rod of the head portion of the external automobile seat can be clamped more firmly, and thus the connection between the automobile headrest and the connecting rod of head portion of the external automobile seat is more stable.

Based on the embodiment above, the clamping component 14 further includes separating bushes 143 detachably connected to the hook portion 146. A structure of each of the separating bushes 143 are a block structure which is bent into an arc-shaped. When the separating bushes 143 are connected to the hook portion 146, the separating bushes 143 are placed in the arc-shaped groove of the hook portion 146 and abut against an inner wall of the arc-shaped groove of the hook portion 146. The separating bushes 143 may be made of rubber, and can be easily replaced so as to prevent the hook portion 146 and the connecting rod of the head portion of the external automobile seat from being worn. By arranging the separating bushes 143 with different sizes, connecting rods with different diameters of the head portion of the external automobile seats can be clamped, and the clamping component is easier to be used.

Based on the embodiment above, as shown in FIG. 5, the clamping component 14 further includes a gear rack 144 arranged at an end of the sliding component 145 away from the hook portion 146, the mounting component 10 further includes a gear wheel 17 whose sides are meshed with two gear racks 144 respectively The two hook portions 146 can be moved synchronously and stably by the arrangement of the rack 144 and the gear wheel 17 and thus the hook portion 146 can be adjusted more conveniently.

Figure 6:
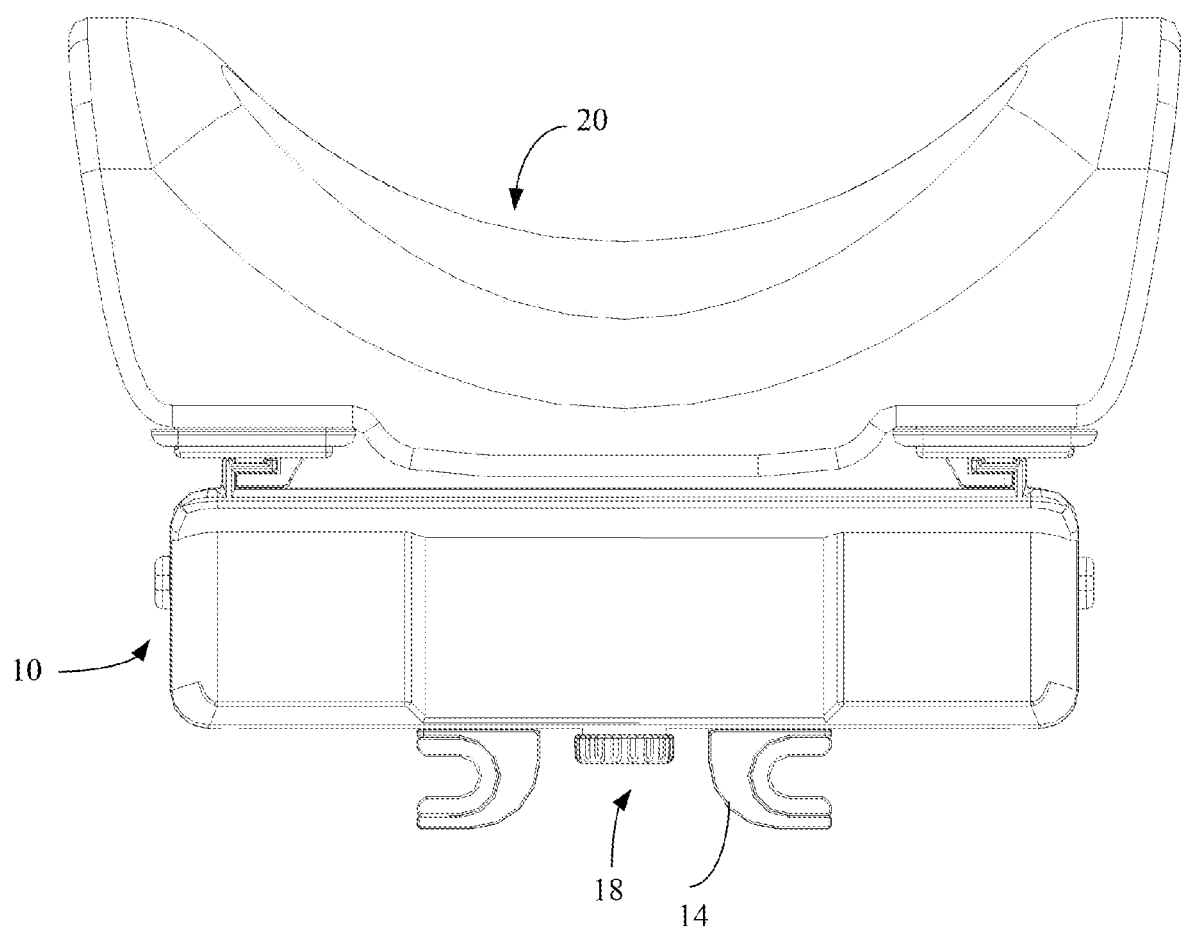
FIG. 6 is a schematic structural diagram of an automobile headrest according to a second embodiment of the disclosure.
Figure 7:
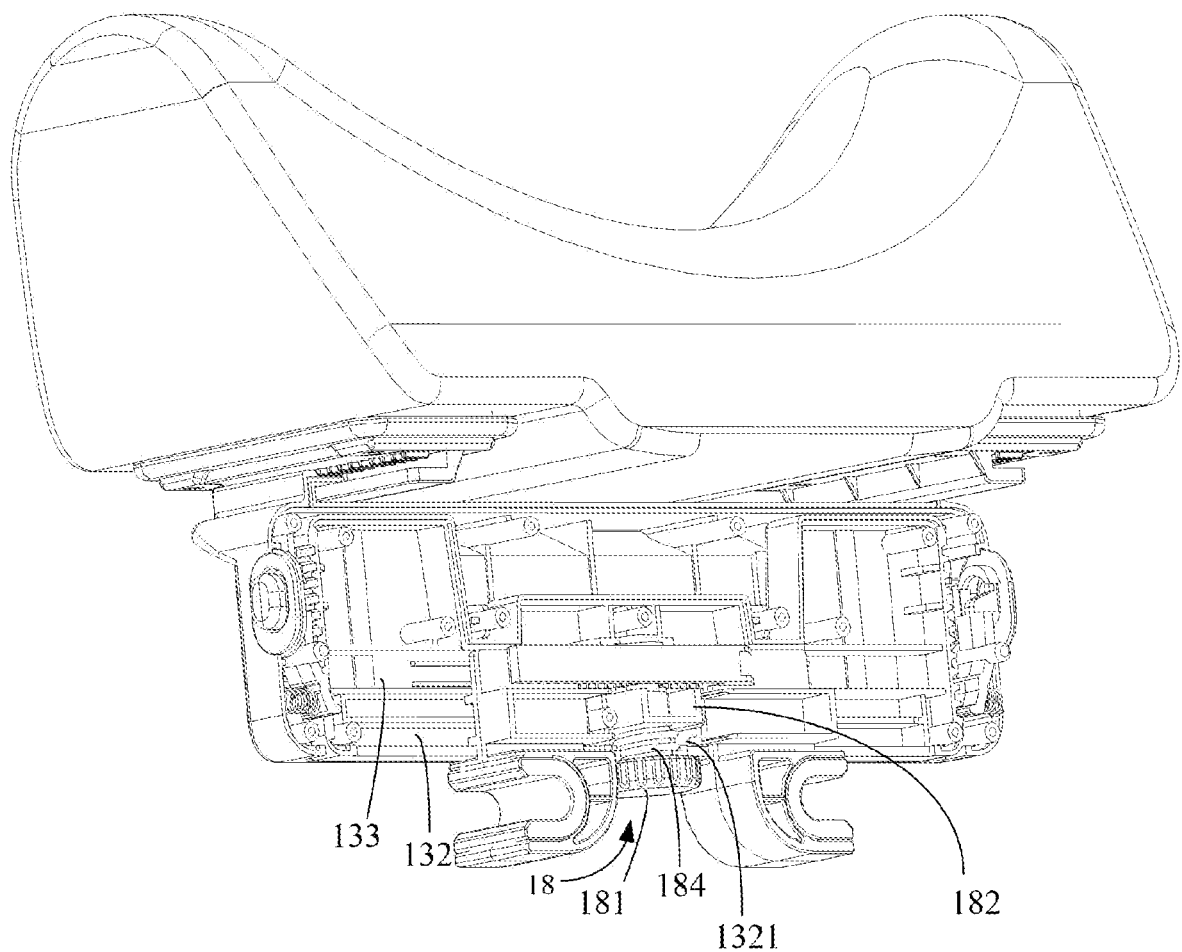
FIG. 7 is a schematic structural diagram of an internal structure of the automobile headrest of FIG. 6.
Figure 8:
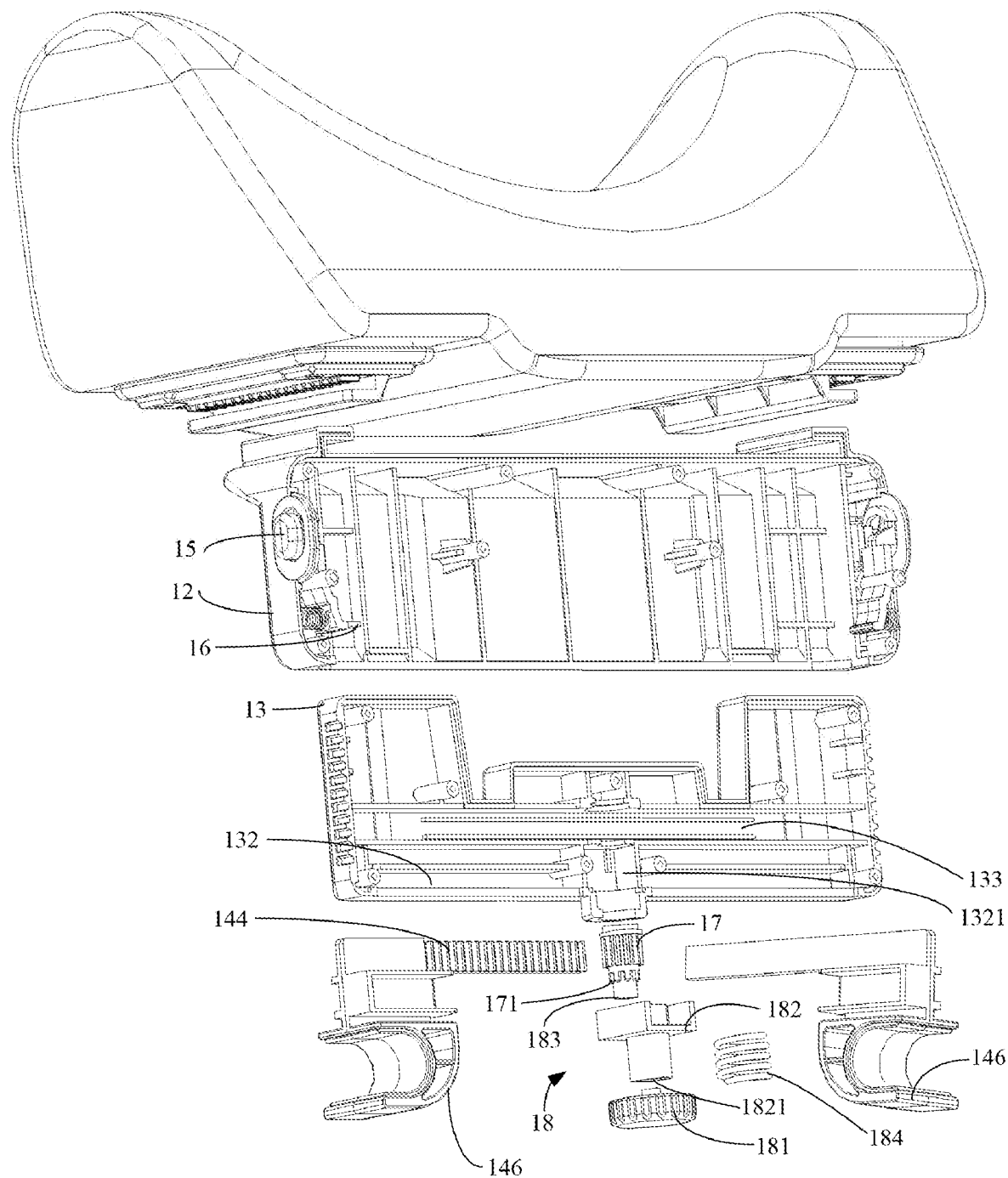
FIG. 8 is a partially exploded schematic structural diagram of the automobile headrest of FIG. 7.
Figure 9:
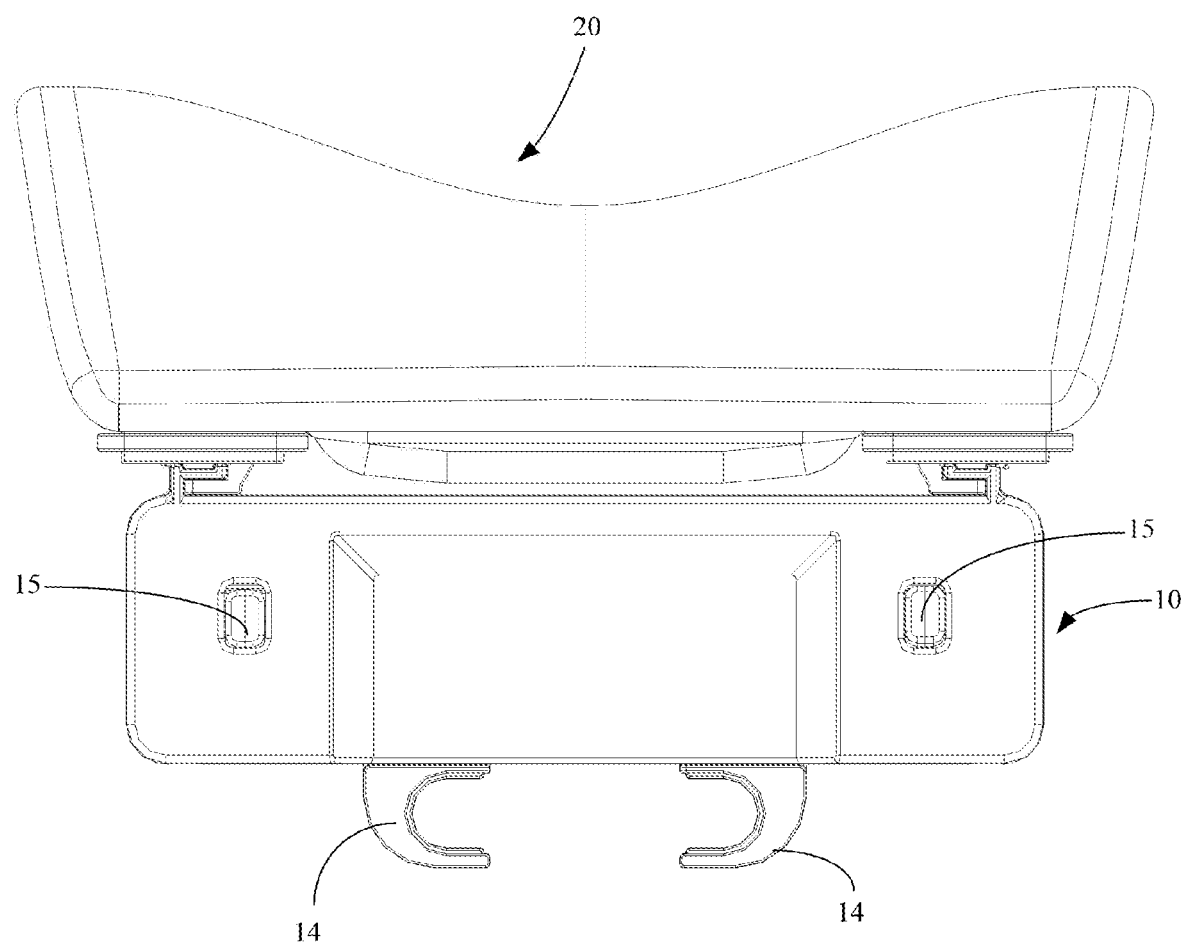
FIG. 9 is a schematic structural diagram of an automobile headrest according to a third embodiment of the disclosure.

Based on the embodiment above, as shown in FIGS. 6 to 8, the mounting component 10 further includes a rotation adjusting component 18, an end of the rotation adjusting component 18 is arranged outside the mounting base 12, and the other end of the rotation adjusting component 18 is connected with a central shaft of the gear wheel 17. In this way, the gear wheel 17 can be driven to be rotated by rotating the rotation adjusting assembly 18, so that the rack 144 can be moved, and the corresponding hook portion 146 can be synchronously adjusted, therefore, it is convenient to be used.

Based on the embodiment above, an accommodating cavity 133 is arranged in the transversely movable component 13 and communicated with the two sliding slots 132, the gear rack 144 and the gear wheel 17 are arranged in the accommodating cavity 133, an installation hole 1321 is arranged between the two sliding slots 132 and used for communicating with the accommodating cavity 133, an end of the rotation adjusting component 18 is arranged outside the transversely movable component 13 and the other end of the rotation adjusting component 18 passes through the installation hole and connects with the central shaft of the gear wheel 17. Therefore, the structure thereof is more compact and is convenient to be adjusted.

Based on the embodiment above, the rotation adjusting component 18 includes a movable knob 181, a fixed block 182, a connector 183 and an elastic component 184, the fixed block 182 is fixedly arranged in the installation hole 1321, the fixed block 182 is provided with a connecting hole 1821 communicating with the accommodating cavity 133, and an inner wall of the connecting hole 1821 is provided with clamping grooves (not shown), an end surface of the gear wheel 17 is provided with at least one convex portion 171 matched with the clamping grooves, the connector 183 is movably arranged in the connecting hole 1821, an end of the connector 183 is connected with the central shaft of the gear wheel 17, and the other end of the connector 183 is protruded from the transversely movable component 13 through the installation hole 1321 and connected with the movable knob 181, an end of the elastic component 184 is abutted against an outer edge of the transversely movable component 13 provided with the installation hole 1321, and the other end of the elastic component 184 is abutted against the movable knob 181. The at least one convex portion 171 of the gear wheel 17 is arranged in the clamping grooves, when the movable knob 181 is at an initial position; the movable knob 181 moves toward a direction approaching the transversely movable component 13 when the movable knob 181 is at an adjusting position; the elastic component 184 is at a compressed state, the gear wheel 17 and the movable knob 181 are moved together, and the convex portion 171 of the gear wheel 17 is separated from the clamping grooves. Wherein the elastic component 184 is of a spring structure, and the connector 183 is of a cylindrical structure, the movable knob 181 can be moved and rotated transversely, therefore, the structure thereof is more compact and is convenient to be adjusted.

It should be noted that the embodiments above are only preferred embodiment of the disclosure, but not intended to be limited thereto. Any equivalent structural transformation made by using the description and drawings of the present application or direct/indirect application in other related technical fields under the concept of the present application are included in the patent protection scope of the present application.

What is claimed is:

1. An automobile headrest comprising a mounting component and a pillow portion detachably connected with the mounting component, wherein
the automobile headrest further comprises a movable block,
the movable block is provided with a plurality of engaging protrusions arranged vertically, and a side of the pillow portion adjacent to the mounting component is provided with a groove,
at least part of the movable block is movably arranged in the groove, an end of the movable block disposed with the engaging protrusions is exposed from a groove opening of the groove, and the engaging protrusions are capable of being selectively received in the groove or protruded from the groove opening of the groove,
the pillow portion is provided with a vertically oriented slideway adjacent to the groove opening of the groove,
the mounting component is provided with a sliding block matched with the slideway, and the sliding block is provided with at least one engagement portion matched with the engaging protrusions,
the sliding block is arranged in the slideway, and the engaging protrusions are protruded from the groove opening of the groove and partially arranged in the engagement portion, in a situation of the pillow portion being connected with the mounting component.

2. The automobile headrest according to claim 1, wherein the pillow portion is provided with a vertically extended supporting block adjacent to the groove opening of the groove, an end of the supporting block away from the pillow portion is bent towards a direction approaching the groove to form a clamping block; the supporting block, the clamping block and a corresponding part of the movable block together form the slideway, and the engaging protrusions are located in the slideway.

3. The automobile headrest according to claim 2, wherein the sliding block comprises a connecting portion arranged on the mounting component, and a sliding portion arranged at an end of the connecting portion away from the mounting component and bent relative to the connecting portion; the connecting portion, the sliding portion and a corresponding part of the mounting component together form an accommodating area,
the engagement portion is arranged on a wall of the sliding portion away from the mounting component,
the sliding portion is arranged in the slideway, the clamping block is arranged in the accommodating area, and the engaging protrusions are protruded from the groove opening of the groove and partially arranged in the engagement portion, in the situation of the pillow portion being connected with the mounting component.

4. The automobile headrest according to claim 1, wherein the movable block is provided with a pressing portion, a spring is arranged in the groove of the pillow portion, the pressing portion is exposed from the groove and positioned outside the slideway, an end of the spring is abutted against an inner wall of the groove, and the other end of the spring is abutted against the movable block.

5. The automobile headrest according to claim 4, wherein a breach is provided at an edge of the groove away from the supporting block, and the pressing portion is exposed from the breach.

6. The automobile headrest according to claim 1, wherein a limiting block is arranged on a side surface of an end of the movable block away from the engaging protrusions, and the limiting block is arranged inside the groove.

7. The automobile headrest according to claim 1, wherein the automobile headrest comprises a connecting block arranged on the pillow portion, an end of the connecting block is connected with the pillow portion, and the other end of the connecting block is provided with the groove.

8. The automobile headrest according to claim 1, wherein the movable block is two in quantity, and the groove is two in quantity; the two grooves are respectively located at two opposite ends of a side of the pillow portion adjacent to the mounting component, and each of the two movable blocks is at least partially located in a corresponding one of the two grooves.

9. The automobile headrest according to claim 1, wherein the mounting component comprises a mounting base, a transversely movable component, and a clamping component; the sliding block is arranged on an end of the mounting base, the transversely movable component is movably arranged on the other end of the mounting base away from the sliding block, the clamping component is arranged on the transversely movable component and capable of being selectively close to the sliding block or away from the sliding block.

10. The automobile headrest according to claim 9, wherein an accommodating slot is provided on an end of the mounting base away from the sliding block, the transversely movable component is at least partially arranged in the accommodating slot, and the clamping component is provided at an end of the transversely movable component exposed from an opening of the accommodating slot.

11. The automobile headrest according to claim 10, wherein the mounting component further comprises an elastic button and a hook arranged on the elastic button, the transversely movable component is provided with engagement slots arranged transversely, and a through-hole communicated with the accommodating slot is provided at a position of the mounting base corresponding to the engagement slots, an end of the elastic button provided with the hook is movably arranged in the accommodating slot, the hook is capable of being selectively arranged in one of the engagement slots, and an end of the elastic button away from the hook is exposed from the through-hole.

12. The automobile headrest according to claim 11, the transversely movable component is provided with two groups of the engagement slots arranged transversely; the two groups of engagement slots are respectively arranged in two opposite side walls of the transversely movable component, or the two groups of engagement slots are arranged on an upper surface of the transversely movable component at intervals, or the two groups of engagement slots are arranged on a lower surface of the transversely movable component at intervals.

13. The automobile headrest according to claim 10, wherein the clamping component is two in quantity, and each of the two clamping components comprises a sliding component, a hook portion and an elastic connector; two sliding slots are provided at an end of the transversely movable component exposed from the opening of the accommodating slot, the two sliding slots are transversely arranged at intervals, the elastic connector is arranged in the sliding slot, the hook portion is arranged outside the sliding slot, an end of the sliding component is arranged in the sliding slot and connected with an end of the elastic connector, the other end of the sliding component is connected with the hook portion, and the two hook portions of the two clamping components are capable of being selectively close to or away from each other.

14. The automobile headrest according to claim 13, wherein the hook portion is a blocky structure which is bent and has an arc-shaped groove, an end of each of the two hook portions is connected with the corresponding sliding component, and groove openings of the arc-shaped grooves of the two hook portions are arranged facing toward or facing away from each other.

15. The automobile headrest according to claim 13, wherein the hook portion is a blocky structure which is bent and has an arc-shaped groove, middle portions of outer walls of the arc-shaped grooves of the two hook portions are connected with the sliding components respectively, and the openings of the arc-shaped grooves are facing away from the sliding block.

16. The automobile headrest according to claim 15, wherein the clamping component further comprises a mounting plate and at least one supporting portion, the mounting plate and the transversely movable component are arranged opposite to and spaced from each other, an end of each of the at least one supporting portion is connected with the transversely movable component, and the other end of the each of the at least one supporting portion is detachably connected with the mounting plate, the hook portion is positioned between the transversely movable component and the mounting plate.

17. The automobile headrest according to claim 16, wherein hook portion is a blocky structure which is bent and has two arc-shaped grooves, the two arc-shaped grooves are transversely arranged side by side, and an opening of each of the two arc-shaped grooves is facing towards the mounting plate.

18. The automobile headrest according to claim 13, wherein the clamping component further comprises a gear rack arranged at an end of the sliding component away from the hook portion, the mounting component further comprises a gear wheel whose sides are meshed with two gear racks respectively, the mounting component further comprises a rotation adjusting component, an end of the rotation adjusting component is arranged outside the mounting base, and the other end of the rotation adjusting component is connected with a central shaft of the gear wheel.

19. The automobile headrest according to claim 18, wherein an accommodating cavity is arranged in the transversely movable component and communicated with the two sliding slots, the gear rack and the gear wheel are arranged in the accommodating cavity, an installation hole is arranged between the two sliding slots and used for communicating with the accommodating cavity, an end of the rotation adjusting component is arranged outside the transversely movable component, and the other end of the rotation adjusting component passes through the installation hole and connects with the central shaft of the gear wheel.

20. The automobile headrest according to claim 19, wherein the rotation adjusting component comprises a movable knob, a fixed block, a connector and an elastic component; the fixed block is fixedly arranged in the installation hole, the fixed block is provided with a connecting hole communicating with the accommodating cavity, and an inner wall of the connecting hole is provided with clamping grooves; an end surface of the gear wheel is provided with at least one convex portion matched with the clamping grooves, the connector is movably arranged in the connecting hole, an end of the connector is connected with the central shaft of the gear wheel, and the other end of the connector is protruded out of the transversely movable component through the installation hole and connected with the movable knob; an end of the elastic component is abutted against an outer edge of the transversely movable component provided with the installation hole, and the other end of the elastic component is abutted against the movable knob, the at least one convex portion of the gear wheel is arranged in the clamping grooves when the movable knob is at an initial position; the movable knob moves towards a direction approaching the transversely movable component when the movable knob is at an adjusting position, the elastic component is at a compressed state, the gear wheel and the movable knob are moved together, and the convex portion of the gear wheel is separated from the clamping grooves.

\* \* \* \* \*